United States Patent Office 3,051,593
Patented Aug. 28, 1962

3,051,593
PROCESS FOR INCREASING THE SCRATCH RESISTANCE OF GLASS
Charles Louis Gray, Jr., Wilmington, and Robert Harold Dettre, Brandywine Hundred, Del., assignors to E. I. du Pont de Nemours and Company, Wilmington, Del., a corporation of Delaware
No Drawing. Filed Sept. 27, 1960, Ser. No. 58,616
5 Claims. (Cl. 117—124)

This invention relates to an improved process for increasing the scratch resistance of glass bodies.

The problem and importance of scratch resistance in glass are discussed in detail by Deyrup in U.S. Patent 2,831,780. It is a practical industrial problem and relates to such items as the weakening of glass bottles by rubbing against each other in transit, the marring of window glass through scratches by impinging dust or glass fragments, and the weakening of textile glass fibers by mutual abrasion.

In said patent, Deyrup offers a method for overcoming this deficiency of glass by treating the glass with the vapors of a metallo-organic compound at a temperature between the lowest annealing temperature of glass and the temperature at which excessive deformation occurs. Such temperature must also be sufficiently high to cause the pyrolysis of the metallo-organic compound to form a metal oxide, which melts or sublimes above the melting point of silicon dioxide, 1710° C. The oxide thus deposited produces an adherent, refractory coating, which substantially increases the scratch resistance of the surface and therefore the practical strength of the glass.

Deyrup describes two methods for carrying out his procedure, both of which however require application of the metallo-organic compound, a titanate ester for instance, in vapor form. Such a process has inherent objections from the viewpoint of large-scale, industrial practice, such as the need for feeding a stream of inert gas containing the vaporized titanate into a heated annealing furnace, which is a process rather difficult to control as to temperature, uniformity of feed-mixture and uniformity of coating. Also, it is rather difficult to maintain the necessary anhydrous atmosphere within the heated chamber and, at the same time, introduce and remove glass objects from the oven. The process is also wasteful, since much of the titanate material fed into the furnace coating chamber finds its way to the walls of the chamber or is hydrolyzed to a useless form.

In processes wherein various articles, including glass, have been coated with titanates for other purposes, for instance to deposit an adhesive layer on the article, it has been suggested to apply the titanate in the form of a solution thereof in an organic solvent. Such processes have the disadvantage of requiring the use of vaporizable, and therefore highly flammable, organic solvents. Also, it is difficult to confine absolutely the vapors of the solvent, and the spreading fumes constitute a constant health hazard to the workers. Finally, some titanate esters hydrolyze readily, so unless the temperature and moisture environments of the treated glass are carefully controlled, the scratch resistance of the resulting article may be unsatisfactory.

Accordingly, it is an object of this invention to provide a process for improving the scratch resistance of glass, which shall be characterized by simplicity and general economy, uniformity of the coating applied, absence of fire and health hazards, assurance against premature hydrolysis of the titanate, and other valuable, practical advantages which will appear more fully as the description proceeds.

Now, according to this invention, we select for the aforementioned treatment a water-soluble organic titanate which is characterized by stability against hydrolysis in the presence of water at ordinary temperature, and we apply said titanate to the glass from an aqueous solution, at room temperature, prior to annealing. Selection of an aqueous solution, not only eliminates fire hazards and health hazards, but also minimizes waste and enables us to apply to the glass article a coating of any desired ultimate thickness by calculating in advance the requisite concentration of the titanate in the aqueous solution.

Following application of the solution in any convenient manner, as by rinsing, immersion or spraying, the glass body may be allowed to dry in open air or it may be transferred directly into the annealing furnace, where it is heated, as in the Deyrup procedure, at or near the annealing temperature, but not sufficiently high to deform perceptibly the shape of the glass article. In the case of bottle glass, the heating temperature may be in the range of 510° to 670° C. With other types of glass, different temperature ranges will be selected, but these are well within the knowledge and understanding of persons skilled in this art. Thus, soft soda glass has an annealing temperature below 400° C.; borosilicate glass, near 580° C. The length of dwell in the annealing furnace will likewise follow customary practice in annealing glass, and may be of the order of a few hours.

Following annealing (or rather as part thereof), the glass is gradually cooled within the furnace atmosphere, as is customary in glass practice. But as a special further feature of this invention, the glass, following cooling, is allowed to stand in the open atmosphere for a period of at least 20 minutes (without any upper limit). This final step, which may be designated as the capping step, has an important influence on the quality of the scratch resistance protection imparted to the article. And while standing for at least 20 minutes in open air before use is apt to occur automatically with almost any article, this step takes on a positive aspect when one considers belt line production of glass articles such as milk bottles. According to our invention, we recommend holding the bottles at rest, in open air, for at least 20 minutes, before they are allowed to proceed on the conveyor belt, in order to "harden" so-to-speak or perfect their scratch resistance before they are exposed to the risk of rubbing against each other while in motion.

As to the chemical nature of the titanate which is to be selected according to this invention, it may be defined generally by the formula

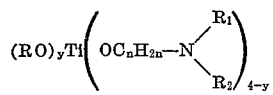

wherein R is an alkyl radical of 2 to 4 C-atoms, $y$ is a number whose average value is from 1 to 2, $n$ is an integer from 2 to 3, and $R_1$ and $R_2$ are members of the group consisting of hydrogen, alkyl of 1 to 3 C-atoms and hydroxyalkyl of 2 to 3 C-atoms. Specific illustrations of conveniently available compounds coming under the above definition are the esters (or mixtures of esters) obtainable by ester interchange reaction between 1 mole of a simple tetraalkyl titanate, for instance, tetraethyl or tetraisopropyl titanate and two moles of a di- or trialkanolamine, for instance, any of the following:

triethanolamine, $N(CH_2CH_2OH)_3$
triisopropanolamine,

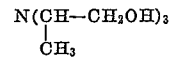

diethyl-monoethanolamine, $(H_5C_2)_2NCH_2CH_2OH$
monomethyl-diethanolamine, $H_3CN(CH_2CH_2OH)_2$
monoethyl-monoethanolamine, $H_5C_2NH—CH_2CH_2OH$
monoethanolamine, $H_2NCH_2CH_2OH$ Most of the above titanate esters are known compounds, and their mode of synthesis is described more fully in Bostwick, U.S. Patent 2,824,114. Those not specifically mentioned in the patent may be prepared by the same general procedures as therein set forth.

Said U.S. Patent 2,824,114 does not set forth any formulas for the products, and intimates in fact that they may be polymeric. Accordingly, the formulas in this application are to be looked upon rather as shorthand expressions for the transesterification products producible according to Bostwick than as a limitation upon the compounds to be employed in this invention.

Furthermore, since the reaction of transesterification does not necessarily replace precisely one, two or three of the alkyl groups throughout the mass of the initial titanate, the products are generally mixtures in which all integral values of $y$ in the above formula are represented. Therefore, the net $y$-value is an average value, having integral or fractional values, and the reaction product is to be more correctly designated a titanate ester composition rather than a single compound.

Compositions of this nature wherein $y$ is substantially greater than 2 are to be avoided. The preferred agents are those in which $y$ has a single value equal to 2; but mixtures in which the average value of $y$ is much less than 2 are useable, if economically available. Accordingly, in the agents practically applicable for this invention, the subscript $y$ may have an average value from 1 to 2.

Without limiting this invention, the following examples are given to illustrate our preferred mode of operation. Parts mentioned are by weight.

*Example 1*

One mole of tetraisopropyl titanate and two moles of triethanolamine are reacted as in Example I of U.S. Patent 2,824,114, to give a product of approximate composition

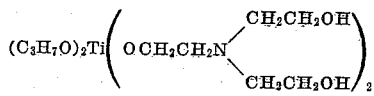

(or a polymer thereof).

Glass bottles are dipped into a 10% solution of the above titanate ester in water. After the excess solution has been allowed to drain from the bottles, they are put through an annealing lehr in which the temperature of the bottles is slowly raised from room temperature to 540° C. and then lowered to room temperature again. After standing for a short time (about 30 minutes) exposed to air, bottles with improved scratch resistance are obtained.

As an alternative method to dipping the bottles as described above, the bottles may be sprayed with the aqueous solution of the above titanate ester.

The scratch resistance achieved can be measured by rubbing two of the treated bottles against each other. When untreated bottles are rubbed in the same manner, they become distinctly scratched, while treated bottles are not.

On a laboratory scale, a convenient method for testing the scratch resistance imparted to glass by any given titanate ester composition is as follows:

A drop of the titanate ester solution to be tested is placed on a clean glass microscope slide, and is spread out by the aid of another glass slide to cover just about one half of the first slide. The other half then remains as a control. The slide is then dried, annealed, cooled and allowed to stand in open air for 20 minutes or more, as in the example above.

When the edge of an untreated slide is then drawn over the treated slide lengthwise, starting from the untreated half, a scratch is produced which terminates abruptly as the boundary of the treated portion is crossed.

In a similar manner, the ester-interchange products of 1 mole of tetraethyl, tetraisopropyl or tetrabutyl titanate with 2 to 3 moles of triisopropanolamine or any other of the alkanolamines listed above may be applied to glass, with the same results.

It will be understood that the details of procedure above set forth may be varied widely within the skill of those engaged in this art. The following additional details will assist in the understanding and control of the invention.

As already mentioned, the thickness of the eventual coating can be controlled by selecting the proper concentration for the applied aqueous solution. This selection can be effected on the basis of an experience chart which correlates the thickness of the final film on the glass in a few cases to the concentrations of the solutions applied in the respective cases. The needed concentration of the solution for any other specified eventual thickness of coating may then be calculated by interpolation or extrapolation in the experience chart.

Desirable thicknesses in the ultimate dry coating are from about 5 to about 100 millimicrons. When the coating exceeds 100 millimicrons in thickness, the scratch resistance begins to drop off.

The thickness of the final coating may be gauged or judged by various means. Thus, with ordinary white light, a coating thicker than 100 millimicrons will show colored diffraction effects.

The nature of the coating and the cause of the scratch resistance observed are only partially understood. The surface coatings produced are known to be amorphous when less than 100 millimicrons thick; that is, they have no regular crystalline characteristics. On the other hand, coatings thicker than 100 millimicrons start to show a crystalline X-ray pattern, which is characteristic of the titanium dioxide mineral anatase.

The method of bonding to the glass surface is not known but is surmised to involve Ti—O—Si bonding.

Glass treated according to this invention is not different in appearance from untreated glass of the same type. But the two can be distinguished by special physical tests. Thus, the coefficient of friction of untreated glass is about 0.8 to 0.9, while that of the treated glass has been found to be about 0.17 to 0.25.

We claim as our invention:

1. In a process for increasing the scratch resistance of a glass body, the steps consisting of applying to the surface of said body an aqueous solution of an organic titanate, allowing the excess moisture to drain, subjecting the treated glass to heating at a temperature sufficient to anneal the glass but below that at which perceptible deformation of the shape of the glass body steps in, cooling the glass body and allowing the same to stand in open air for not less than 20 minutes before exposing the same to handling wherein rubbing of the glass body against other glass bodies is likely to occur, said organic titanate being a titanate ester composition obtained by subjecting one mole of a tetraalkyl titanate whose alkyl radicals contain from 2 to 4 C-atoms to transesterification with from 2 to 3 moles of an alkanolamine of the formula

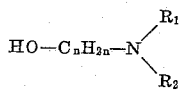

wherein $n$ is an integer from 2 to 4, and $R_1$ and $R_2$ are members of the group consisting of hydrogen, alkyl of 1 to 3 C-atoms and hydroxyalkyl of 2 to 3 C-atoms.

2. A process as in claim 1, wherein the organic titanate is an ester composition of the formula

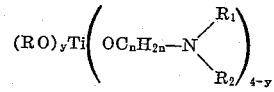

wherein R is an alkyl radical of 2 to 4 C-atoms, $y$ is a number whose average value is approximately 2, $n$ is an integer from 2 to 4, and $R_1$ and $R_2$ are members of the group consisting of hydrogen, alkyl of 1 to 3 C-atoms and hydroxyalkyl of 2 to 3 C-atoms.

3. A process as in claim 1, wherein the temperature in the heating step is between 510° and 670° C.

4. A process as in claim 1, wherein the organic titanate employed is essentially diisopropyl-bis(diethanolaminoethyl) titanate.

5. A process as in claim 1, wherein the organic titanate employed is essentially diisopropyl-bis(diisopropanolamine-isopropyl) titanate.

References Cited in the file of this patent

UNITED STATES PATENTS

| | | |
|---|---|---|
| 2,478,817 | Gaiser | Aug. 9, 1949 |
| 2,768,909 | Haslam | Oct. 30, 1956 |
| 2,805,965 | Robinson | Sept. 10, 1957 |
| 2,824,114 | Bostwick | Feb. 18, 1958 |
| 2,831,780 | Deyrup | Apr. 22, 1958 |
| 2,838,418 | Starkweather | June 10, 1958 |
| 2,911,324 | Evans et al. | Nov. 3, 1959 |
| 2,950,174 | Lagally | Aug. 23, 1960 |